United States Patent [19]

Way et al.

[11] 3,790,283
[45] Feb. 5, 1974

[54] TOTAL LOOP GAIN INDICATOR FOR OPTICAL NULL SPECTROPHOTOMETER

[75] Inventors: Allan S. Way, Irvine; William J. Hayman, Fullerton, both of Calif.

[73] Assignee: Beckman Instruments, Inc., Fullerton, Calif.

[22] Filed: Jan. 31, 1973

[21] Appl. No.: 328,477

[52] U.S. Cl.................... 356/89, 356/88, 356/93, 359/96
[51] Int. Cl. ............................................. G01j 3/42
[58] Field of Search....... 356/88, 89, 90, 91, 92, 93, 356/94, 95, 96, 97

[56] References Cited
UNITED STATES PATENTS
2,984,149  5/1961  Herscher et al. ..................... 356/89

*Primary Examiner*—Ronald L. Wibert
*Assistant Examiner*—V. P. McGraw
*Attorney, Agent, or Firm*—John G. Mesaros; Robert J. Steinmeyer

[57] ABSTRACT

An optical null spectrophotometer having means for setting up the instrument gain for optimum response prior to insertion of a sample in the sample beam, the means including a voltage source to provide an unbalancing voltage to close the reference beam attenuator, a gain adjustment potentiometer in the detector output circuit and a visual readout device for indicating optimum gain with the reference beam attenuator in a closed position.

4 Claims, 1 Drawing Figure

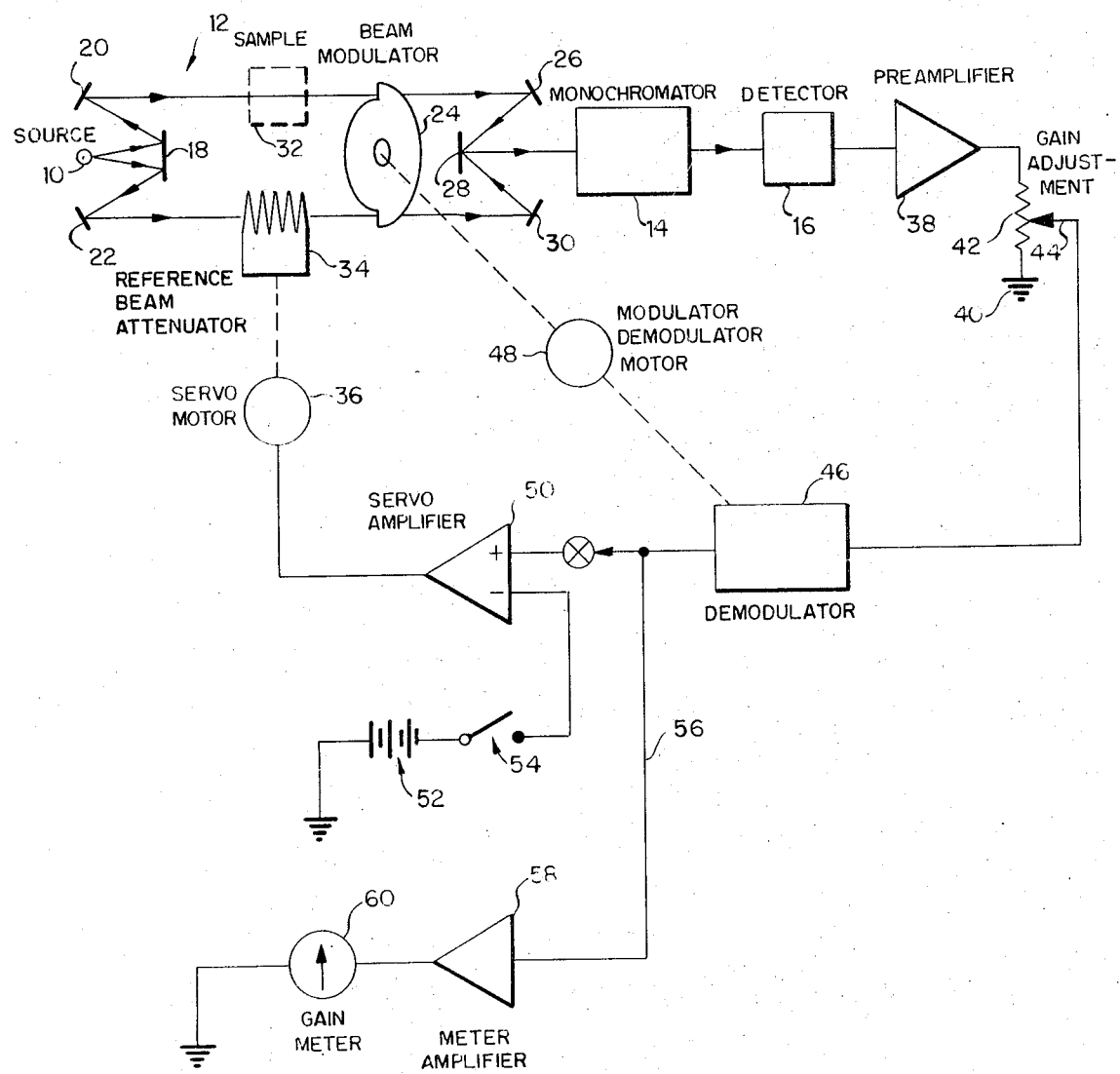

TOTAL LOOP GAIN INDICATOR FOR OPTICAL NULL SPECTROPHOTOMETER

BACKGROUND OF THE INVENTION

This invention relates to analyzers of the double beam, optical null type such as spectrophotometers utilizing beam intensity balancing, and in particular, to new apparatus for initially setting up such instruments to a total loop gain for optimum response.

In analyzers of this type, radiation from a source is switched along a reference beam path and a sample beam path, the two beams being modulated and recombined at a thermocouple or other electrical signal generator. A sample to be analyzed is placed in one path and the error signal is used to drive a servo which varies the intensity of the beam in the other path to achieve a null or zero signal at the thermocouple. The servo position is a measure of the sample content. Ordinarily, the wavelength of the radiation source is scanned over a range by a monochromator during the measurement to provide a spectrum measure of the sample.

The sensitivity and accuracy of the instrument is affected by variations in loop gain of the attenuator servo loop which includes the optical path, the electrical circuitry and the servomotor. If the loop gain is set too high, oscillation occurs, and if the loop gain is set too low system response is too slow.

SUMMARY OF THE INVENTION

Accordingly, it is an object of the invention to provide an accurate and repeatable way to set up the instrument gain of such instruments for optimum response.

It is a further object of this invention to provide a new and improved instrument utilizing a single beam energy meter for indicating optimum instrument gain.

The foregoing and other objects of the invention are accomplished by providing a double-beam, optical null analyzer having beam control means for directing radiation from the source through the monochromator to the sensing unit alternately along reference and sample paths, the energy along the two paths being modulated, the output of the sensing unit being demodulated to drive a servomotor coupled to a reference beam attenuator which controls the energy in the reference path beam to balance the energies in the paths. A potentiometer device is provided between the sensing unit and the demodulator to adjust the instrument loop gain. The servo amplifier for the servomotor of the reference beam attenuator is provided with a second input coupled to a voltage source having a polarity to drive the servomotor to close the reference beam attenuator. The output of the demodulator is coupled to a meter amplifier and to a gain meter in series therewith. With the reference beam attenuator in its closed position and no sample in the sample path the gain adjustment potentiometer is adjusted until the gain meter indicates within a certain predetermined range indicating optimum loop gain. The voltage source is then decoupled from the servo amplifier.

The novel features which are believed to be characteristic of the invention are set forth with particularity in the specification which can best be understood by reference to the following description and accompanying drawing.

BRIEF DESCRIPTION OF THE DRAWING

The sole FIGURE is a block diagram of a spectrophotometer incorporating the total loop gain indicator of the invention.

DESCRIPTION OF THE PREFERRED EMBODIMENT

Referring now to the drawing, the instrument includes a source 10, a beam switching system 12, a monochromator 14 and a detector device 16, which may be for example a thermocouple. The source 10 may be any suitable device which produces radiation over the spectrum being analyzed. The beam switching system 12 includes a beam splitter 18 which splits radiation from the source 10 into two beams which are intercepted by reflecting mirrors 20 and 22 respectively to redirect the energy along sample and reference paths. The two parallel paths are modulated by a suitable beam modulator disc 24 which aternately directs the radiation from the sample path and the reference path to the monochromator 14. The radiation along sample path is intercepted by reflecting mirror 26 to beam combiner 28 into monochromator 14, while radiation along the reference path is directed to reflecting mirror 30 and thence to the recombining means 28. A sample cell 32 (shown in dotted lines) is positioned in the sample beam path for containing the sample to be analyzed. Means for varying the intensity of the beam along the reference path is positioned therein, and typically includes a comb or reference beam attenuator 34 which is driven into and out of the reference beam path by a motor 36.

The output of detector 16 is amplified through preamplifier 38 to provide a voltage signal to ground 40 across potentiometer 42. The sliding tap 44 of gain adjustment potentiometer 42 is coupled to demodulator 46, the output of which governs the speed of a modulator/demodulator motor 48 which drives the segmented disc or beam modulator 24. The output of demodulator 46 also provides an error signal which provides an input to servo amplifier 50 which drives servomotor 36 to thereby drive reference beam attenuator 34 into the reference beam until such time as the energies along the sample path and reference path are substantially equal at which time the error signal goes to zero.

The sensitivity and accuracy of the instrument is affected by variations in loop gain of this attenuator servo loop which includes the optical path, the electrical circuitry for processing the detector output and and the servomotor.

In order to optimize the attenuator servo loop gain the reference beam attenuator 34 is driven in a direction to eliminate the energy of the reference beam path, and with no sample 32 in the sample beam path, the single beam energy thus provided is the sole energy impinging on detector 16. The output of amplifier 38 entering demodulator 46 is adjusted by means of potenitometer 42 until an optimum loop again is provided. In order to accomplish this a voltage source 52 is provided in series with a switch 54, which when closed provides an unbalancing signal to a second input of servo amplifier 50 to thereby drive servomotor 37 until reference beam attenuator 34 eliminates the energy from the reference beam path. The output of demodulator 46 is then taken along lead 56 to a meter amplifier 58, the output of which is coupled to a gain meter 60 for measuring the single beam energy of the system. The gain meter 60 is provided with a scale, having for example a colored range indicating a predetermined value of optimum response for the given instrument. The gain adjustment potentiometer 42 is then adjusted to control the input demodulator 46 and thereby vary the output appearing on line 56 passing through meter amplifier 58 and gain meter 60. After the gain meter 60 indicates an energy level within the predetermined desired range the switch 54 is then opened to thereby permit the output of demodulator 46 to drive servomotor 36 in a direction to advance beam attenuator 34 out of the reference beam path until the reference beam path energy and sample beam path energy are substantially identical at which time the output of demodulator 46 has its error signal driven to zero. In this manner the loop gain is optimized and the instrument is then ready for utilization by insertion of the sample 32 into the sample beam path for measurement.

While there has been shown and described a preferred embodiment, it is to be understood that various other adaptations and modifications may be made within the spirit and scope of the invention.

We claim:

1. In a double beam, optical null analyzer having a radiation source, means defining reference and sample beam paths, a beam attenuator, an attenuator drive for positioning the attenuator in the reference beam path, a radiation sensing unit for generating an electrical signal as a function of radiant energy directed thereto, and means coupling the electrical signal to the attenuator drive for varying the position of the beam attenuator with respect to the electrical signal, the combination comprising:

means selectively coupled to the attenuator drive for positioning the beam attenuator in the reference beam path independently of the electrical signal means for varying the electrical signal; and indicating means coupled for receiving said varied electrical signal to thereby indicate the system energy of the sample beam path in the absence of a sample.

2. The combination according to claim 1 wherein said means selectively coupled to said attenuator drive includes a voltage source and a switch.

3. The combination according to claim 2 wherein said indicating means is a gain meter.

4. The combination according to claim 1 wherein the radiant energy in the reference and sample beam paths is modulated, the electrical signal is coupled to a demodulator and said indicating means is coupled to the output of said demodulator.

* * * * *